United States Patent [19]
Bullock et al.

[11] Patent Number: 5,764,651
[45] Date of Patent: Jun. 9, 1998

[54] BIT ERROR RATE DETECTION SYSTEM

[75] Inventors: Dean C. Bullock, San Francisco; Sudhindar Balakrishna, Cupertino, both of Calif.

[73] Assignee: Integrated Device Technology, Inc., Santa Clara, Calif.

[21] Appl. No.: 650,084

[22] Filed: May 17, 1996

[51] Int. Cl.$^6$ ........................................ G06F 11/00
[52] U.S. Cl. ............................ 371/5.5; 371/5.1
[58] Field of Search .......... 371/5.5, 5.1; 375/202, 375/222

[56] References Cited

U.S. PATENT DOCUMENTS

5,307,351  4/1994  Websters ....................... 375/202
5,561,955  10/1996  Jacobsmeyer .................. 375/222

*Primary Examiner*—Phung Chung
*Attorney, Agent, or Firm*—Isabelle R. McAndrews; Larry E. Vierra

[57] ABSTRACT

A system for determining a data stream using a variable length window for sampling of erred bits in the data stream is disclosed. A threshold maximum-allowable error rate is selected; a first window length to comprise a data stream sample is selected; the data stream is monitored for errors during the given window length; the allowable error is compared to the total number of errors detected during the monitoring step; and, if the detected error is greater than the allowable error, the window length is reduced and monitoring is continued using the reduced window length, else monitoring continues over successive window length periods. A signal degrade or signal fail condition signal is generated if the window length reaches zero. The system can be utilized to implement an automatic protection switching system for a SONET network.

22 Claims, 5 Drawing Sheets

BIT ERROR RATE DETECTION SYSTEM

BACKGROUND OF THE INVENTION

1. Field of the Invention

The invention relates to detection of error rates in the data stream, and particularly detection of the bit error rate in a synchronous optical network (SONET) data stream.

2. Description of the Related Art

High speed telecommunications networks have gained increasing importance as the demands for more bandwidth for data and voice traffic rise. An ideal telecommunications network environment would allow voice and data to be mixed, would support bandwidth-on-demand for data-intense applications, would provide network robustness and resiliency, and would offer flexible and fast service. One such network standard which tends to address these demands is the synchronous optical network (SONET).

SONET is an optical transmission standard which is based on the digital signal (DS) hierarchy. The latter includes DS0 (64 kilobits per second), DS1 (1.544 megabits per second), and DS3 (approximately 45 megabits per second transmission). SONET extends the standard electrical interfaces of the digital signal hierarchy to optical signals.

Figure 1:
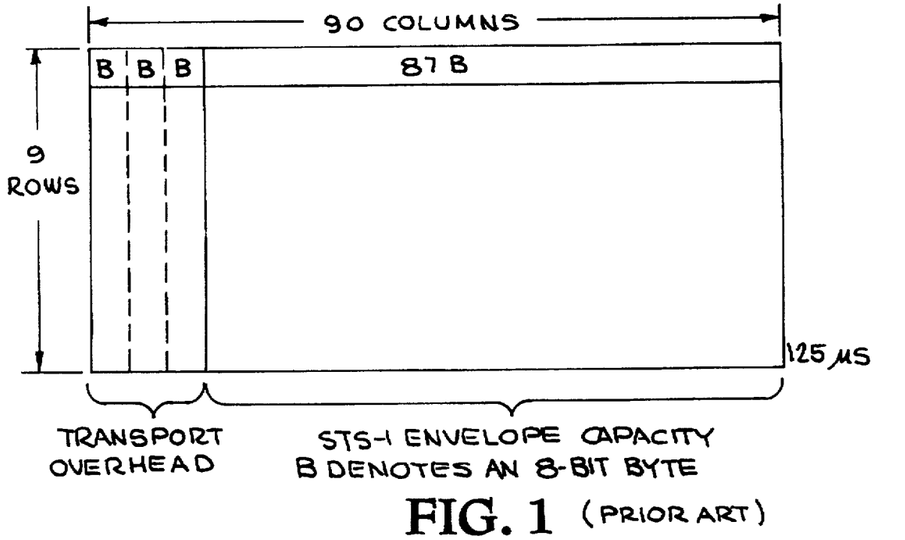
FIG. 1 is a representation of a conventional SONET frame.

SONET defines optical carrier (OC) levels and electrically equivalent synchronous transport signals (STS) for the transmission hierarchy. The base format of SONET is a synchronous STS-1 level that operates at 51.84 Mbps; the STS-3c bit rate is 155.52 mb/s. The format of the STS-1 SONET frame is shown in FIG. 1. An STS-1 frame is comprised of 90 columns and 9 rows of bytes yielding a total frame size of 810 bytes or 6480 bits. An STS-3c frame has 19940 bits which is the concatenation of 3 STS-1 frames. The frame includes a transport overhead region, occupying the first three columns of the frame (27 bytes), and a payload envelope (generally referred to as the synchronous payload envelope (SPE)). The frame is transmitted byte-by-byte beginning with byte 1, scanning left to right, from row 1 to row 9. Transmission time for the entire frame is approximately 125 microseconds. Higher level signals (STS-N) are integer multiples of the basic rate (STS-1). Thus, STS-3 interleaves three STS-1 frames yielding an effective data rate of 155.52 Mbps. STS-1 electrical frames are interleaved and converted to optical format to form OC-N signals.

SONET is useful in its ability to interface with traditional, existing networks. For example, the most prominent of such networks is the telephone network. The SONET frame format is chosen such that the 125 microseconds transmit time fits with the standard telephone 64 kilobytes per second frame. SONET also provides the necessary bandwidth transport information from one broad-band integrated services digital network (BISDN) switch or terminal to another.

Further, many of these broad band services may use asynchronous transfer mode (ATM), a fast-packet-switching technique using short, fixed-length packets.

One feature of SONET is its extensive error monitoring and correction capability. This capability is "built in" to the frame overhead, to allow for speedy and remote detection of errors and compensation before they degrade to serious levels. Several bytes in the SONET frame overhead are reserved for a method of error monitoring called Bit Interleave Parity-8 (BIP-8). BIP-8 creates an even parity over the bits in the transmitting signal. SONET network topology can be organized into several types of rings, each of which provides for automatic network restoration in the event of a network failure.

One feature of such automatic restoration is automatic protection switching (APS). Essentially, APS is a backup technique used to switch fiber channels when one channel degrades. One type of automatic protection switching is line-protection switching, which is accomplished by duplicating the bidirectional line connection between two point-to-point fiber multiplexers. A second type of APS is path protection switching, in which data traffic is sent on two channels, compared at the receiving end and only the best copy is used.

Figure 2:
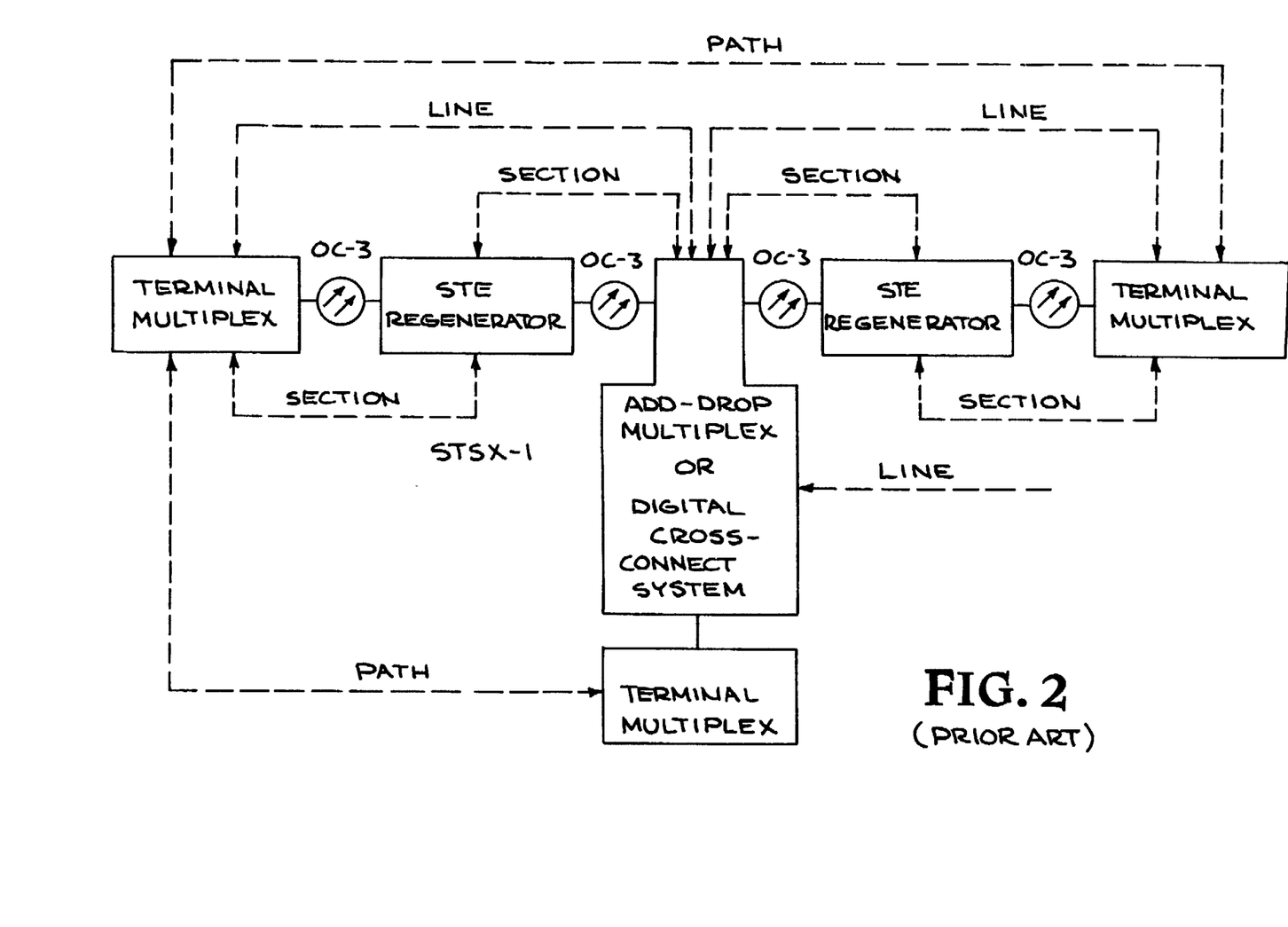
FIG. 2 is a block level diagram of a conventional SONET network.

A high level block diagram of a SONET network is shown in FIG. 2. As shown therein, a SONET network may comprise several network elements (NE) including terminal multiplexers (TM), optical carriers (OC-3), STE regenerators (RGTR), and a digital cross-connect system (DCS) or add/drop multiplexer (ADM). Each optical carrier section OL-3 carries a number of fiber data channels. In line protection switching, if a working pair of fibers is disrupted or degraded, the signal loss is detected and traffic can be switched to a backup or protection pair.

Because routing and bandwidth are under software control, this allows for flexibility in configuring the network. In order to implement the automatic protection switching scheme of the SONET specification, the bit error rate (BER) of a particular transmission channel is calculated. The bit error rate for a particular transmission may be defined as:

EQUATION 1:

$$\text{BIT ERROR RATE (BER)} = \frac{\text{ERRED BITS PER FRAME}}{\text{TOTAL BITS PER FRAME}}$$

The APS section of the SONET specification states that, if the bit error rate exceeds a certain pre-set threshold, a line fail or line warning should be promulgated such that controlling equipment can switch the data stream to secondary transmission systems. In most cases, the secondary transmission system is a second cable or fiber link.

Figure 3:
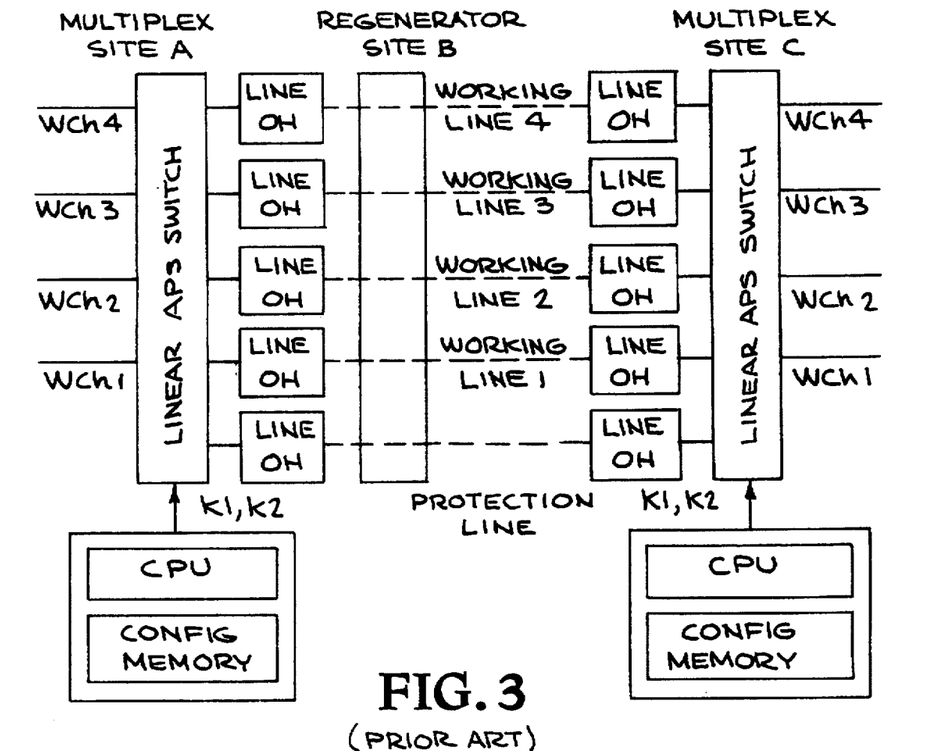
FIG. 3 is a block level diagram of a conventional 1:N linear automatic protection switch architecture.

FIG. 3 illustrates a protection switching scheme between two multiplexer sites (site A and site C) of a 1:N bidirectional linear APS system. Shown in FIG. 3 are a number of working lines (WL1–WL4) and a protection line. A respective control processor and configurable system memory is operatively coupled to each of the multiplex sites A and C.

In general, line switching proceeds as follows. If no failures occur on the working line, the protection line is not in use.

If, for example, transmission on working line 2 degrades in the direction from multiplex site A to multiplex site C, the failure is detected at site C. A request is sent from site C to site A for the working line 2 to be bridged. At site A, working line 2 is bridged and a reverse request is sent from A to C for working line 2 to be also bridged at site C. In response, site C will select the working line 2 and bridge that working line 2. Site A will likewise select working line 2 and a bidirectional switch will be completed.

The standard method for determining the bit error rate is to detect erred bits and keep count, and to periodically divide the number of erred bits in a given time period by the total number of bits in the time period (the time period may be defined as 0.125 microsecond or 1 SONET frame). For purposes of APS, the number of erred bits is determined by using the bit interleave parity (BIP-8) check. Each SONET frame (T) carries the BIP of the previous frame (T−1) in time. When a frame, for example, T−1 is received, its actual BIP is calculated and saved as the "receive side" BIP check. When the next frame (for example, T) is received, the transmit-side BIP for frame T−1 is carried in that next frame T, and can be compared with the saved, calculated BIP. The number of erred bits in frame T−1 can be determined by comparing the receive-side, saved BIP for T−1 with the transmit-side BIP carried in frame T.

The conventional method of implementing BER determination and APS is to maintain a running sum of BIP errors in a hardware counter of limited size. This counter should be read and reset approximately once per second. The value read from this counter is used along with the time difference between reads to calculate the bit error rate. One counter per stream is required. There is no upper limit on the number of errors which can accumulate in the counter between reads.

This basic method of BER determination may be applied using complex algorithms in software to approach an exact BER value over time. This conventional method suffers from the drawback that the controlling hardware and software read the counter of each SONET device approximately once every second. As the number of channels increases, the number of SONET devices on a SONET interface also increases. This forces the controlling hardware and software to spend more and more time reading BIP counters and leaves less time for other vital tasks.

SUMMARY OF THE INVENTION

In accordance with the invention, the bit error rate of a data stream, for example a SONET data stream, may be determined by using a variable length window for sampling of erred bits in the data stream. In one embodiment, a threshold maximum-allowable error rate is selected; a first window length to comprise a data stream sample is selected; the data stream is monitored for BIP-8 errors during the given window length; the allowable error is compared to the total number of errors detected during the monitoring step; and, if the detected error is greater than the allowable error, the window length is reduced and monitoring is continued using the reduced window length, or a signal degrade or signal fail indication is generated if the window length falls below a minimum.

In a further aspect, an automatic protection switching system for a SONET network is provided. The network element of the network will include a control processor and a configurable memory operatively coupled to the control processor. The configurable memory includes an integer multiple register, a window length register, a threshold register, and an interrupt control register configured therein. The system further includes a multiplexer, coupled to the control processor, the multiplexer having coupled thereto a plurality of optical carriers. The system memory will contain program code for causing the processor to: read the BIP for frame T−1 transmitted in frame T; compare, for a number of frames equalling the window length value multiplied by the denominator count value, the calculated BIP for frame T−1 with the actual received BIP for frame T−1; add the errors which result from the step of comparing to the cumulative error register; query the cumulative number register to determine if the cumulative number of errors equals the threshold register value such that if the cumulative number of errors exceeds the threshold, then increase the window length register value, if not, then decrease the window length register value; and generate an error signal if the window length equals zero.

The system allows for accurate prediction of the bit error rate threshold in compliance with the requirements of a SONET specification, and reduces the resources of hardware and software required to implement the bit error rate detection scheme of the SONET interface.

These and other advantages of the system will be clear from a reading of the detailed description.

BRIEF DESCRIPTION OF THE DRAWINGS

The system will be described with respect to the particular embodiments thereof. Other objects, features, and advantages of the system will become apparent with reference to the detailed description and drawings in which.

DETAILED DESCRIPTION

A system for detecting an error rate threshold in a network environment is described herein. The invention has specific applicability with respect to a SONET network but can have broader applicability in any transmission system where maintenance below a known error rate threshold is desired.

In the following description, numerous details, for example, specific materials, process steps, etc., are set forth in order to provide a thorough understanding of the present invention. It will be understood, however, by one skilled in the art that the specific details need not be employed to practice the present invention. Moreover, non-essential or generally understood details of particular processes or structures may not be specifically presented in order not to unduly obscure the invention where such details would be readily apparent to one of average skill in the art.

The system of the present invention for detecting a BER threshold and triggering can be used in conjunction with the technique utilized in the current method of polling a system memory register. The system detects a close approximation of the BER threshold violation by using a sliding window averaging scheme of BIP errors, rather than maintaining a running and ever-growing total of the BIP error count in a long-length counter. SONET controlling hardware can be notified, through an interrupt, when the actual BER crosses a pre-set threshold within a certain time period within a given probability. One advantage of the present invention is that the bit error rate is calculated without using any divide circuitry and a sliding window average of the BER is provided. The sliding window can be adjusted to modify the detection time.

Figure 4:
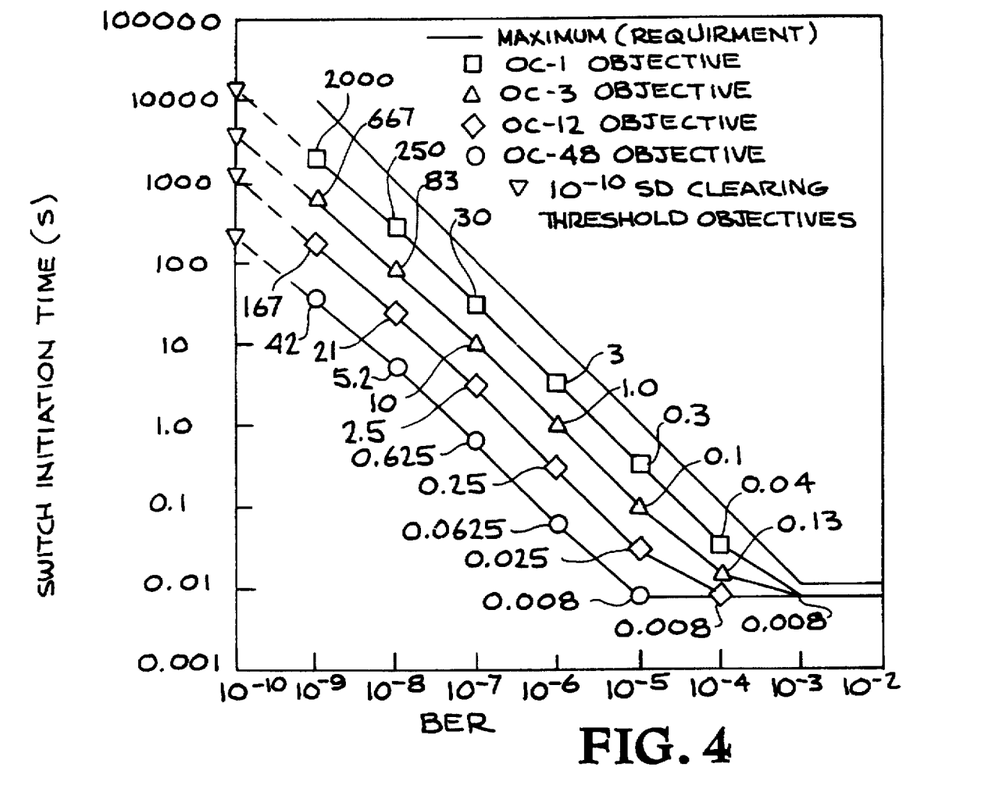
FIG. 4 is a graph representing the switch initiation timed criteria for the SONET specification.

The SONET specification requires that the BER shall be detected within a particular time period to initiate switching under the automatic protection sequence. FIG. 4 shows a correlation between the bit error rate and the switch initiation time. As shown in FIG. 4, the switch initiation time period changes as a function of the optical carrier level. As the bit error rate (BER) increases, the switch initiation time decreases.

In essence, the threshold BER at which it is desirable to initiate a switchover to a different data channel in the optical carrier is a known quantity based on the known transmission rates of the network. The occurrence of errors on an optical signal is expected to be a random process. Therefore, for any particular actual BER, there will be some probability that the number of errors detected in a corresponding time period will be less than the known BER threshold.

The SONET specification defines that when the actual BER is greater than or equal to a "signal detect" or "signal fail" threshold, it should be quickly detected as such and a switch, if appropriate, should be initiated. According to the SONET specification, any BER detection system should have a relatively small probability of falsely detecting a threshold crossing when the actual BER is below the threshold and should be tolerant to burst errors.

A "signal fail" condition occurs when a line bit error rate exceeds $10^{-3}$ erred bits per frame on an incoming OC-N (OC-1, OC-2, OC-3, etc.) signal. This BER threshold for a signal fail condition may be provisionable over a range of $10^{-3}$ to $10^{-5}$. A "signal degrade" condition is a "soft failure" resulting from the aligned BER exceeding a pre-selected threshold. The BER threshold for a signal degrade condition is usually in the range of $10^{-5}$ to $10^{-9}$.

In accordance with one embodiment of the invention, the BER detection threshold is determined by Equation 2:

$$\text{BER DETECTION THRESHOLD} = \frac{BT}{(DM+1)(19.224 \times 10^3)}$$

where DM has a high byte (more significant) and a low byte, and the variables in Equation 2 are defined as shown in Table 1:

TABLE 1

| Name | Functional Specifics<br>Function Summary |
| --- | --- |
| Denominator Multiple | Number of frames that are used to compute the BER |
| BIP Threshold (BT) | Numerator of the BER fraction |

The total window length (in frames) is defined according to Equation 3:

TOTAL WINDOW LENGTH=(WL)(DM+1)

where WL is the sliding window length in frames.

Figure 5:
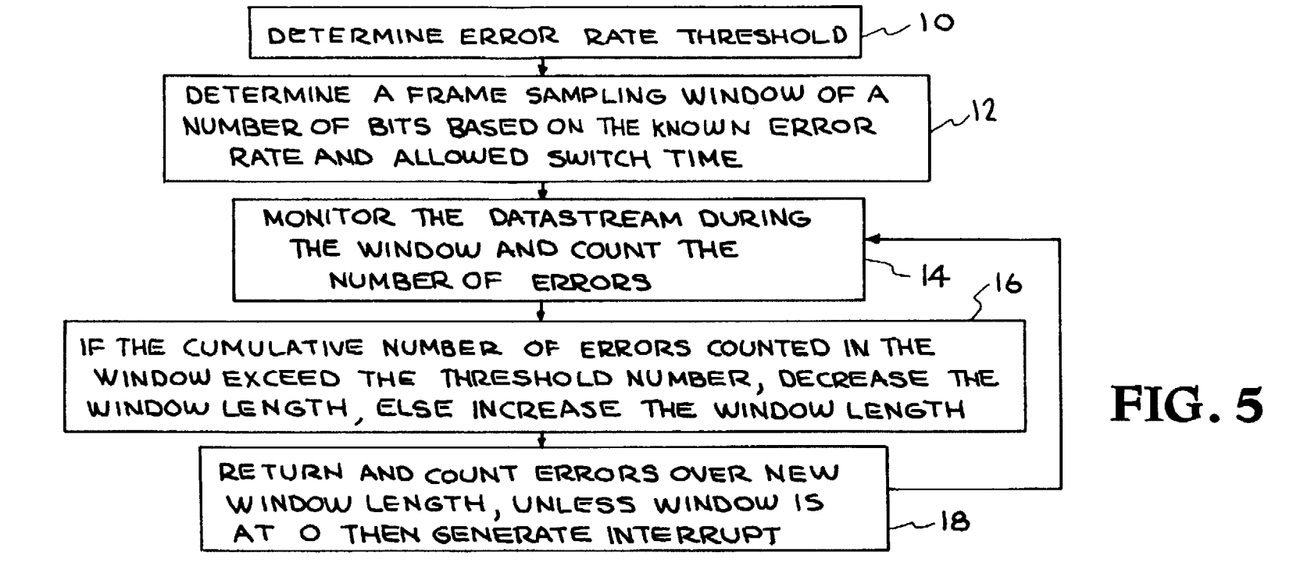
FIG. 5 is a flow chart of the method for determining the bit error rate threshold in accordance with the invention.

FIG. 5 shows a method in accordance with the present invention for detecting the BER of a data stream. As shown in FIG. 5, the first step 10 requires a definition of the error rate threshold or BER trigger threshold whose violation is to be monitored. This threshold can be user-defined or set in accordance with the SONET specification.

At step 12, the frame sampling window is defined in terms of, for example, the number of bits. The window length (in frames) which is used, in one embodiment of the system, is a multiple of the denominator multiple, in accordance with Equation 3. Based on the desired BER detection threshold, the denominator multiple will serve as one component, along with the window length (WL), which determines the data sample period for calculation of the BER. The initial WL is determined based on the bit interleave parity threshold (BT) in the numerator of Equation 2 which, when coupled with the denominator multiple chosen, will allow for detection of the specified BER detection threshold.

The data stream is monitored during the specified total window length (Equation 3), and the number of errors (BT in Equation 2) is counted for the duration of the total window length. At step 16, if the cumulative number of errors counted in the total window length exceeds the allowable threshold, the total window length is shortened by decreasing WL, and the routine returns at step 18 to step 14 to continue counting errors in the new total window length. If the number of errors does not exceed the allowable threshold, the window length is increased (to a maximum of the initial WL) and the routine returns at step 18 to step 14 to continue monitoring the data stream during the window length. As seen by steps 14–16, if the error rate continually exceeds the threshold, the window length will collapse to zero. If the window length collapses to zero, at step 18, an interrupt will be generated to cause a signal failure or signal degrade signal to be provided.

Figure 6:
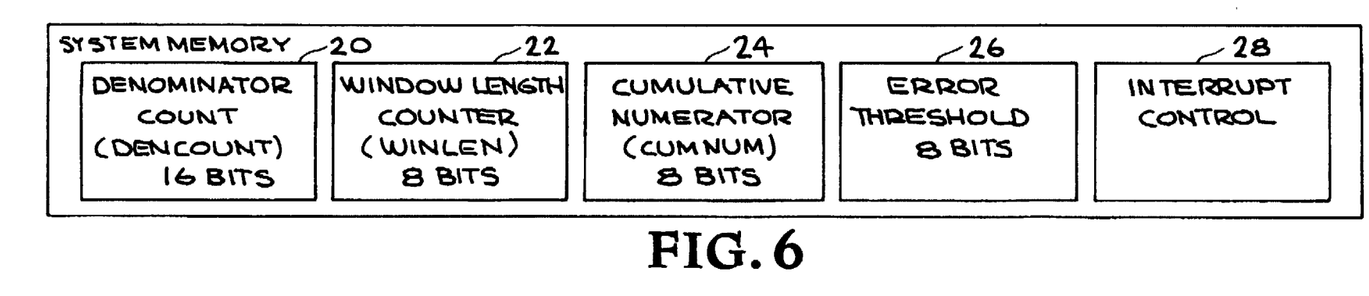
FIG. 6 is a block representation of the system memory register configuration in accordance with the present invention.
Figure 7:
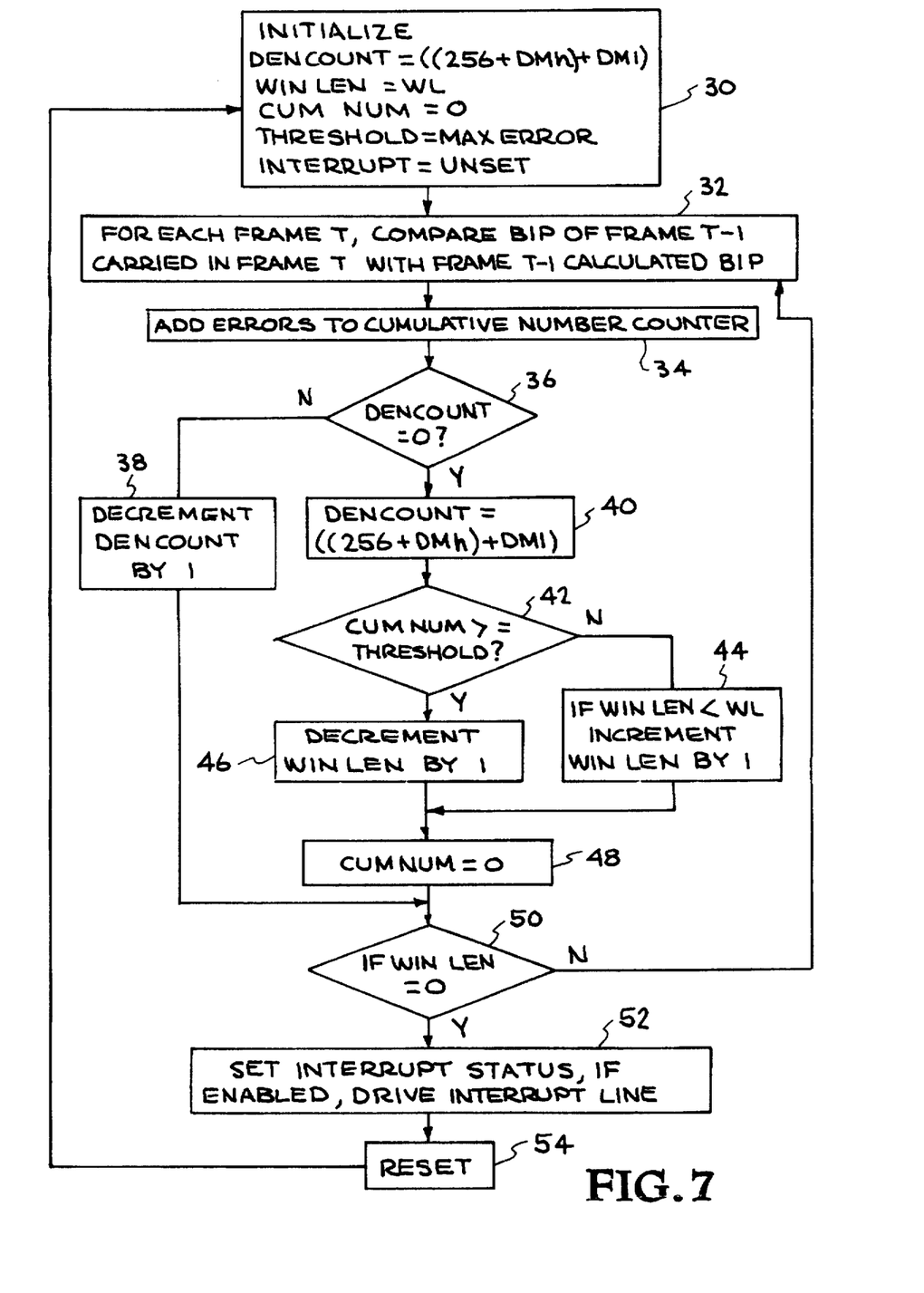
FIG. 7 is a flow chart of a BER determining method used in conjunction with the memory configuration shown in FIG. 6.

The specific implementation of the method of the present invention is described with respect to FIGS. 6 and 7.

FIG. 6 shows configuration of the system memory shown in block form in FIG. 3 in the system of the present invention. Five registers are defined in system memory to implement the present invention. A denominator count register (DENCOUNT), comprising 16 bits, counts the number of window lengths remaining in the current pass of the BER calculation algorithm. A window length counter (WINLEN) is an 8-bit register which tracks the current length of the averaging window in frames. The cumulative numerator register 24 (CUMNUM) is an 8-bit register which tracks the cumulative sum of BIP errors found in the current pass of the BER calculation algorithm. Essentially, the CUMNUM register is a cumulative error tracking register.

The error threshold register 26 is the maximum number of probable errors for a given bit error rate. This register is compared to the value in register 22 (CUMNUM) at the end of the current pass of the BER calculation algorithm. Finally, interrupt control register 28 contains mask and status bits to enable interrupt control and signalling interrupts. The software must clear the status bit to enable the system to begin BER detection.

FIG. 7 illustrates one embodiment of an algorithm utilizing the aforementioned registers for tracking the BER in the system of the present invention. At step 30, the denominator count register is loaded with the denominator multiple which consists of the denominator multiple-high (DMh) (the actual number of frames), plus a one-byte offset (DMl). DMh and DMl are concatenated to form a 16-bit number. The resulting number is the actual number of frames.

The window length counter (WINLEN) is loaded with the initial window length (WL), the cumulative numerator counter is set to zero, the threshold counter is set to the maximum allowable number of errors for a given bit error rate, and the interrupt register is loaded to indicate an interrupt has occurred.

The data stream includes a continuous series of STS-N frames (T) wherein each frame T includes the actual BIP for the previous frame in time (T–1). When frame T–1 reaches the receiving end, the BIP for frame T–1 is calculated and stored.

At step 32, for each frame T, the bit interleave parity contained in frame T for frame T–1 is compared with the calculated value of frame T–1. At step 34, as a result of step 32, the errors which are found between the calculated value and the received value are added to the CUMNUM counter register. At decision block 36, the denominator counter is checked to determine whether the counter is equal to zero. If the denominator multiple is not equal to zero, at step 38, DENCOUNT is decremented by one and the process then continues to step 50 as the sampling window is not complete. If DENCOUNT is equal to zero, the sampling window is complete. DENCOUNT is reset at step 40, and the cumulative number of errors is tested against the threshold value in step 42. If the number of errors in the cumulative number counter exceeds the threshold count, the window length value (WL) is decreased by one. If the number of errors is less than the threshold maximum number of errors, then, at step 44, a check is made to determine whether the window length counter is less than the initial window length WL. If so, the window length variable is incremented by one. Thus, at step 44, the window length WINLEN is not increased to a greater window length than the initial window length WL. In either case, the cumulative number counter is reset to zero and, at step 50, if the window length has not equalled zero, the routine loops back to step 32 and the comparison of bit interleave parity on a frame-by-frame basis continues. If the window length has equalled zero, this means that the threshold number of errors has been exceeded by the cumulative number of errors in the previous window for a sufficient period of time that the window length has been decremented at step 46 within the allowable time period for determining a given error rate as defined by FIG. 4. Thus, at step 52, the interim status will be set and interrupt line driven. Once the interrupt has been made, the routine resets at step 54 by looping back to step 30.

FIG. 7 can be described by the following pseudo-code:

```
initialize {
    Denominator Counter loaded with ((256 * DMh) + DM1)
    Window Length Counter loaded with (WL)
    Cumulative Numerator loaded with (zero)
    Error Threshold loaded with (BT)
    Interrupt Control loaded to indicate interrupt has occurred
}
if interrupt status not set {
    for each received frame {
        compare received BIP with previous frame's calculated BIP
        add errors to value in CumNum
        if (DenCount equal to zero) {
            DenCount reloaded with ((256 * DMh) + DM1)
            if (CumNum greater than or equal to Threshold) {
                decrement WinLen by one
            } else if (WinLen less than (WL)) {
                increment WinLen by one;
                CumNum reloaded with zero
        } else {
            decrement DenCount by one
        }
        if (WinLen equal to zero) {
            set interrupt status
            if enabled, drive interrupt line
            reset machine to initial values
        }
    }
}
```

Thus, the routine shown in FIG. 7 will handle incidental spikes in the error rate within the given time frame. By proper selection of the denominator multiple and the window length, the required depiction time shown in FIG. 4 can be achieved.

Using the aforementioned formulas, the values set forth in Table 2 were utilized on a simulated data stream consisting of an error generator, generating bit interleave parity bytes per frame with a Gaussian distribution about a predefined value. The simulator simulates the SONET stream by creating a stream of simulated (Hamming Distance (BIP(T), BIP(T-1)). It provides a stream of simulated differences between calculated (T-1) BIP and carried (T) BIP. The equations provided an approximation of the actual detection times and thresholds. Simulation can be used to determine optimum values for the particular application:

TABLE 2

Register Values (for STS-3c)

| Desired BER Trigger | Desired Detection Time | Denominator Multiple | Window Length | BIP Threshold | Calculated BER Trigger | Calculated Detection Time |
|---|---|---|---|---|---|---|
| 1e-3 | .008s | 0 | 64 | 19 | .988e-3 | .008s |
| 1e-4 | .013s | 0 | 104 | 2 | 1.040e-4 | .013s |
| 1e-5 | 0.1s | 20 | 38 | 4 | .991e-5 | .0998s |
| 1e-6 | 1.0s | 989 | 8 | 19 | .998e-6 | .990s |
| 1e-7 | 10.0s | 7849 | 10 | 15 | .994e-7 | 9.81s |
| 1e-8 | 83.0s | 41615 | 16 | 7 | .875e-8 | 83.23s |
| 1e-9 | 667.0s | 52313 | 102 | 1 | .994e-9 | 666.99s |

As will be noted from Table 2, the calculated detection time for the calculated BER trigger is less than the required ("desired detection") time as defined in FIG. 4.

The system of the present invention has broader applicability outside SONET. The system of the present invention will be applicable in all detection schemes wherein a known error rate is sought to be determined. A time averaging window may be selected based on any number of quantifiable rates in a particular data stream, or sampling of data. Notably, in the embodiment shown in FIG. 7, no divide calculations are required, hence saving control processor overhead.

Figure 8:
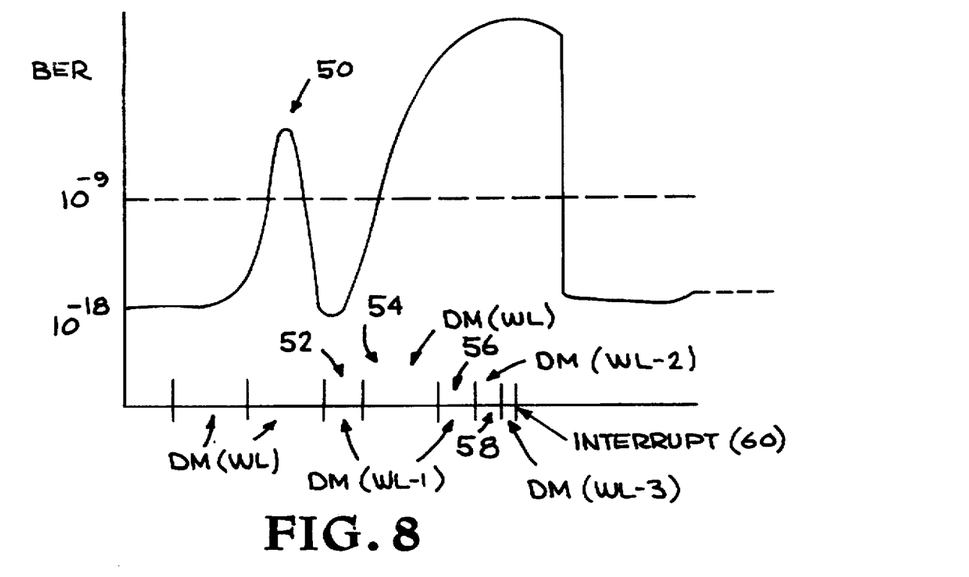
FIG. 8 is a graph illustrating the variance of the window length vs. the BER of the signal.

FIG. 8 is a graph illustrating the effect of the present invention. FIG. 8 is a graph of the bit error rate, on the vertical axis, versus incoming frames in the data stream, on the horizontal axis. If the bit error rate stays below the threshold level, in this case defined as $10^{-9}$, the window length during which the algorithm of FIG. 7 will examine the data stream will remain at a length defined by the denominator multiple DM multiplied by the initial window length W6. (It should be noted that the denominator multiple DM does not change in FIG. 8 and can be considered a constant since the graph of FIG. 8 only illustrates steps 40 through 50, and not the loop between step 36, 38 and 50. If the denominator multiple is not zero, the WL portion of the window length function does not change.) At peak 50, the counted errors have exceeded the error rate threshold at $10^{-9}$ but have returned to the lower error rate of $10^{-18}$ prior to the completion of the window. Hence, the following window length 52 will be equal to the denominator multiple (DM) multiplied by the new, shorter window length WL-1. The cumulative number of errors will be counted in the shorter window length and since the cumulative number of errors will not have exceeded the threshold, the window length will return to the initial window length at step 54. In window 54, the error rate again exceeds the threshold at $10^{-9}$ and in window 56, because of the decrement of the window length variable, window 56 will be smaller. Because the error rate stays above the threshold during window 56, the window is decremented again so that window 58 is again smaller. The window length will keep collapsing to zero, when an interrupt is generated at point 60.

In this manner, a minimum number of fixed length counters are all that is required to generate the APS signal switching in accordance with the BER detection requirements of the SONET specification.

The many features and advantages of the present invention will be apparent to one of average skill in the art. The system of the present invention, while shown herein implemented as a combination of hardware and software, can be implemented entirely in hardware or software. All such features and advantages are intended to be within the scope of the invention as defined by the written specification, and as defined by the accompanying claims.

What is claimed is:

1. A process, comprising the steps of:
   (a) selecting an allowable bit threshold based on a bit error rate;
   (b) selecting a window length comprising a number of frames over which a sample of the bit error rate will be compared;
   (c) comparing an actual bit interleave parity for a frame t−1 with a calculated value of the error rate for the frame t−1;
   (d) storing an error detected in the bit interleave parity; and
   (e) comparing the number of stored errors detected in step (d) with the allowable bit threshold to determine an adjustment of the window length, said adjustment corresponding to changing said window length when the number of stored errors is different from the allowable error rate.

2. The process of claim 1, wherein changing said window length comprises
   decreasing the window length if such errors exceed the allowable error rate; and
   increasing the window length if such errors do not exceed the allowable error rate.

3. The process of claim 1 wherein the process further includes the step of:
   (f) generating a signal if the window length decreases below a selected minimum.

4. The process of claim 1 wherein said step (b) comprises the substeps of:
   for each frame T, where T is an integer, calculating a bit interleave parity (BIP) for the frame, the bit interleave parity reflecting the bit error rate;
   reading the BIP for a frame T−1 transmitted in the stored frame; and
   comparing the calculated BIP for frame T−1 with an actually received BIP for frame T−1.

5. The process of claim 1 wherein said step (c) comprises:
   adding the errors which result from the step of comparing to a cumulative error counter.

6. The process of claim 1 wherein said step (e) comprises:
   querying a cumulative error register to determine if a cumulative number of errors equals the allowable threshold, and
   if the cumulative number of errors exceeds the threshold, then increasing the window length, if not, then decreasing the window length.

7. The process of claim 6, wherein if the cumulative number of errors exceeds the threshold, said window length is increased by one.

8. A system for calculating the bit error rate of a data channel in a SONET network to enable automatic protection switching in accordance with the SONET specification, comprising:
   establishing a threshold bit error rate and switch initiation time;
   monitoring a data stream using a sliding window averaging calculation in which:
   if the error rate is below the threshold bit error rate, the window length remains constant,
   if the error rate increases above the threshold bit error rate, the window decreases in length such that the window decreases to zero if the error rate exceeds the threshold level for a time period equal to or less than the switch initiation time; and
   generating a switch signal if the window length decreases to a minimum value.

9. The system of claim 8 wherein the step of monitoring comprises:
   providing a denominator count register, a window length count register, a cumulative error register and a threshold register;
   inputting a denominator count value into the denominator count register;
   inputting an initial window count value into the window count register;
   inputting a bit error threshold into the threshold register;
   calculating for each frame T where T is an integer, a bit interleave parity (BIP) for frame T, the bit interleave parity reflecting the bit error rate;
   reading the BIP for frame T−1 transmitted in frame T;
   comparing, for a number of frames equalling the window length value multiplied by the denominator count value, the calculated BIP for frame T−1 with the BIP received for frame T−1;
   adding the errors which result from the step of comparing to the cumulative error register;
   querying the cumulative error register to determine if the cumulative number of errors equals the threshold register value;
   if the cumulative number of errors exceeds the threshold, then increasing the window length register value, if not, then decreasing the window length register; and
   generating an error signal if the window length equals zero.

10. The system of claim 9, wherein if the cumulative number of errors exceeds the threshold, said window length register value is increased by one.

11. A process for determining the bit error rate of a data stream within a time period, comprising:
    (a) selecting an allowable error;
    (b) selecting a sampling quantity of bits in the data stream;
    (c) monitoring the data stream for errors during the sampling;
    (d) comparing the allowable error to errors detected during the monitoring step; and
    (e) if the errors detected are greater than the allowable error, reducing the sampling quantity of bits, else increasing the sampling quantity of bits and returning to step (b).

12. The process of claim 11 wherein said step (b) comprises selecting a window length based on an integer number of frames in the data stream.

13. The method of claim 12 wherein the step (b) comprises selecting a multiple and multiplying the window length by the multiple.

14. The process of claim 11 wherein the step of selecting comprises defining a window length multiplied by a multiple.

15. The process of claim 11 wherein said step (c) comprises:
    calculating a bit interleave parity for a received frame; and
    extracting a bit interleave parity for a previously-received frame from a received frame.

16. The process of claim 11 wherein said step (d) comprises:

storing the errors detected in said step (c); and comparing said stored errors to a threshold error value.

17. The method of claim 11 wherein step (e) further comprises:

generating an error signal if the sampling quantity equals zero.

18. A process operable in a network element having a control processor and configurable memory, the process for determining the bit error rate in a SONET data stream, the data stream comprising a plurality of frames having a common frame length, comprising the steps of:

providing a denominator count register, a window length count register, a cumulative error register and a threshold register;

inputting a denominator count value into the denominator count register;

inputting an initial window count value into the window count register;

inputting a bit error threshold into the threshold register;

calculating for each frame T where T is an integer, a bit interleave parity (BIP) for frame T, the bit interleave parity reflecting the bit error rate;

reading the BIP for frame T−1 transmitted in frame T;

comparing, for a number of frames equalling the window length value multiplied by the denominator count value, the calculated BIP for frame T−1 with the actual received BIP for frame T−1;

adding the errors which result from the step of comparing to the cumulative error register;

querying the cumulative error register to determine if the cumulative number of errors equals the threshold register value;

if the cumulative number of errors exceeds the threshold, then increasing the window length register value, if not, then decreasing the window length register; and generating an error signal if the window length equals zero.

19. The process of claim 18, wherein if the cumulative number of errors exceeds the threshold, said window length register value is increased by one.

20. A system memory coupled to a microprocessor, the memory including a plurality of memory registers and instructions for the microprocessor, the instructions comprising;

selecting an allowable bit error rate;

selecting a window length comprising a number of frames over which a sample of the bit error rate will be compared;

comparing an actual bit interleave parity for frame T−1 carried in frame T to a previously calculated value for the frame T−1;

storing any errors detected in the bit interleave parity between frames in a register;

at the end of the window, comparing errors accumulated to the allowable bit error rate and if said errors accumulated exceed the allowable bit error rate, decreasing the window length; or if said errors accumulated do not exceed the allowable error rate, increasing the window length.

21. An automatic protection switching system for a SONET network, comprising:

a control processor;

a configurable memory operatively coupled to the control processor, having an integer multiple register, a window length register, a threshold register, and a cumulative error register configured therein;

a multiplexer, coupled to the control processor, the multiplexer having coupled thereto a plurality of optical carriers; and program means for causing the processor to:

read a bit interleave parity for a frame T−1 transmitted in frame T; window length value multiplied by a denominator count value, a bit interleave parity calculated for frame T−1 with a bit interleave parity received for frame T−1;

add the errors which result from the step of comparing to the cumulative error register;

query the cumulative error register to determine if a cumulative number of errors equals the threshold register value;

if the cumulative number of errors exceeds the threshold, then increase the window length register value, if not, then decrease the window length register; and generate an error signal if the window length equals zero.

22. The automatic protection switching system of claim 21, wherein if the cumulative number of errors exceeds the threshold, said window length register value is increased by one.

* * * * *